(12) United States Patent
Nestoryak (10) Patent No.: US 7,500,238 B2
(45) Date of Patent: Mar. 3, 2009

(54) METHOD AND SYSTEM FOR INSTALLING A SOFTWARE PLATFORM ONTO A COMPUTER SYSTEM

(75) Inventor: Philip C. Nestoryak, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 09/934,896

(22) Filed: Aug. 22, 2001

(65) Prior Publication Data
US 2003/0041236 A1     Feb. 27, 2003

(51) Int. Cl.
*G06F 9/445* (2006.01)

(52) U.S. Cl. .................................. 717/177; 717/175

(58) Field of Classification Search ......... 717/162–167, 717/168–178, 100; 713/2
See application file for complete search history.

(56) References Cited

U.S. PATENT DOCUMENTS

| | | | | |
|---|---|---|---|---|
| 5,379,296 A | | 1/1995 | Johnson et al. | 370/402 |
| 5,410,699 A | * | 4/1995 | Bealkowski et al. | 713/2 |
| 5,621,912 A | | 4/1997 | Borruso et al. | 718/1 |
| 5,794,052 A | | 8/1998 | Harding | 717/178 |
| 5,872,956 A | | 2/1999 | Beal et al. | 717/124 |
| 5,872,975 A | | 2/1999 | Hedin et al. | 709/224 |
| 5,896,534 A | | 4/1999 | Pearce et al. | 710/17 |
| 5,956,727 A | | 9/1999 | Cheng et al. | 707/102 |
| 5,960,175 A | | 9/1999 | Grossman et al. | 709/222 |
| 6,016,495 A | | 1/2000 | McKeehan et al. | 707/103 R |
| 6,063,128 A | | 5/2000 | Bentley et al. | 703/6 |
| 6,094,531 A | | 7/2000 | Allison et al. | 717/176 |
| 6,098,158 A | * | 8/2000 | Lay et al. | 711/162 |
| 6,304,965 B1 | * | 10/2001 | Rickey | 713/2 |
| 6,421,777 B1 | * | 7/2002 | Pierre-Louis et al. | 713/2 |
| 6,591,363 B1 | * | 7/2003 | von Below | 713/2 |
| 6,697,940 B1 | * | 2/2004 | Perez et al. | 713/1 |

OTHER PUBLICATIONS

Hohndel et al, "Automated Installation of Linux Systems Using YAST", The USENIX Association, pp. 260-266, 1999.*
RedBooks, "e-Business Intelligence: Leveraging DB2 For Linux on S/390", IBM.com/redbooks, pp. i-xii, 1-218, Jul. 2001.*
SuSE Linux AG Whitepaper, "SUSE Automatic Installation and Configuration Using YaST", SuSE Linux AG, pp. 1-5, 2002.*

* cited by examiner

*Primary Examiner*—Ted T Vo
(74) *Attorney, Agent, or Firm*—John Pivnichny; Hoffman Warnick LLC (57) ABSTRACT

A method and system for loading a software platform onto a computer system is provided. The method and system allow a user to designate a target computer system by entering computer model and submodel identifiers, and to select a particular software platform. A control file pertaining to the selected software platform is then located and queried to identify an entry in the control file having computer model identifiers and submodel identifiers that match the entered identifiers. If a match is established, support data from the identified entry is displayed. Based upon the support data, a boot disk can be created and the selected software platform can loaded onto the designated computer system.

35 Claims, 4 Drawing Sheets

METHOD AND SYSTEM FOR INSTALLING A SOFTWARE PLATFORM ONTO A COMPUTER SYSTEM

BACKGROUND OF THE INVENTION

1. Technical Field

The present invention generally relates to a method and system for loading a software platform onto a computer system. Specifically, the present invention relates to a method and system for automatically locating and querying a control file to load a selected software platform on a designated computer system.

2. Background Art

As the use of the computer technology becomes more pervasive, software programs are constantly improving to provide users with valuable features. One type of software program is a software platform. An example of a software platform is an operating system (e.g., Windows, Linux, etc.), which when loaded by a boot program, manages all other programs onto a computer system. To date, many types and versions of software platforms are available. Accordingly, computer users frequently upgrade/load new software platforms on their computer systems.

Loading new software platforms, however, can be especially cumbersome for businesses that own numerous computer systems with different technical specifications. This often makes the loading of new software extremely difficult because each "target" computer system must first be examined to determine whether it meets the minimum technical requirements for loading of the desired software.

The problem is compounded by the licensing requirements of software producers. Specifically, in order for a software platform to be legally loaded onto a target computer system, a proper software license must be possessed. Although this is generally not an issue when loading the same software platform that came preloaded onto a computer system, it is a complex issue when loading a new software platform. Thus, not only must the user determine whether the target computer system meets the minimum technical requirements, but the user must also determine whether the license requirements have been met.

To date, businesses have attempted to streamline the loading process by providing a World Wide Web site informing the user whether a computer system can support a particular software platform. Such web sites, however, rarely have up to date information and require time-consuming manual searches. Another option is to provide a file corresponding to a particular software platform. The file could have a list of target computer systems that can support the software platform. Users manually locate the file and then manually check for individual target computer systems. Such an option, however, has numerous drawbacks including: (1) difficulty in manually locating the file; and (2) having to make a time consuming manual search of the located file.

In view of the foregoing, there exists a need for a method and system for loading a software platform onto a computer system. A need exists for such a method and system to automatically locate and search a control file to determine whether a target computer system can support a selected software platform (e.g., whether the target computer system meets the technical and legal requirements for loading).

SUMMARY OF THE INVENTION

The present invention overcomes the drawbacks of existing systems by providing a method and system for loading a software platform onto a computer system. Specifically, a user will designate a particular target computer system by entering computer model and submodel identifiers pertaining to the designated computer system via an interface. Then, the user will select a particular software platform. A control file corresponding to the selected software platform will then be automatically located and queried to identify an entry in the control file that has computer model and submodel identifiers that match the entered identifiers. If a match is established, support data from the identified entry is displayed for the user to verify that the designated computer system can support the selected software platform (e.g., all technical and licensing requirements are met). If the designated computer system can support the selected software platform, a boot disk is created and the platform will be loaded.

According to a first aspect of the present invention, a method for loading a software platform onto a computer system is provided. The method comprises the steps of: (1) providing a control file having entries of computer system identifiers; (2) designating a computer system and a software platform using an interface; and (3) querying the control file to identify an entry having computer system identifiers that pertain to the designated computer system.

According to a second aspect of the present invention, a method for loading a software platform onto a computer system is provided. The method comprises the steps of: (1) providing a control file having entries, wherein each entry comprises computer system identifiers and support data; (2) entering particular computer system identifiers into an interface; (3) selecting a particular software platform using the interface; (4) querying the control file to identify an entry having computer system identifiers that match the entered computer system identifiers; and (5) loading the selected software platform onto a computer system having the entered computer system identifiers.

According to a third aspect of the present invention, a method for loading a software platform onto a computer system is provided. The method comprises the steps of: (1) entering a particular computer model identifier and a particular computer submodel identifier into an interface; (2) selecting a particular software platform using the interface; (3) locating a control file having entries, wherein each entry comprises computer model identifiers, computer submodel identifiers, and support data; (4) querying the located control file to identify an entry having a computer model identifier and a computer submodel identifier that match the entered computer model identifier and computer submodel identifier; (5) displaying the support data from the identified entry; and (6) loading the selected software platform onto a computer system having the entered identifiers based upon the displayed support data.

According to a fourth aspect of the present invention, a system for loading a software platform onto a computer system is provided. The system comprises: (1) an interface for entering computer system identifiers and for selecting a software platform; (2) a query system for querying a control file to identify an entry in the control file having computer system identifiers that match the entered computer system identifiers; and (3) a boot system for creating a boot disk for the selected software platform to be loaded onto a computer system having the entered computer system identifiers.

According to a fifth aspect of the present invention, a system for loading a software platform onto a computer system is provided. The system comprises: (1) an entry system for entering computer system identifiers; (2) a selection system for selecting a software platform; (3) a query system for querying a control file to identify an entry having computer system identifiers that match the entered computer system identifiers; and (4) a boot system for creating a boot disk for the selected software platform to be loaded onto a computer system having the entered computer system identifiers.

According to a sixth aspect of the present invention, a system for loading a software platform onto a computer system is provided. The system comprises: (1) an interface having: (a) an entry system for entering a computer model identifier and a computer submodel identifier; and (b) a selection system for selecting a software platform; (2) a query system for locating and querying a control file to identify an entry in the control file having a computer model identifier and a computer submodel identifier that match the entered computer model identifier and computer submodel identifier; (3) a display system for displaying support data from the identified entry; and (4) a boot system for creating a boot disk for the selected software platform to be loaded onto a computer system having the entered computer model identifier and computer submodel identifier.

According to a seventh aspect of the present invention, a program product stored on a recordable medium for loading a software platform onto a computer system is provided. When executed, the program product comprises: (1) an interface for entering computer system identifiers and for selecting a software platform; (2) a query system for querying a control file to identify an entry in the control file having computer system identifiers that match the entered computer system identifiers; and (3) a boot system for creating a boot disk for the selected software platform to be loaded onto a computer system having the entered computer system identifiers.

According to an eighth aspect of the present invention, a program product stored on a recordable medium for loading a software platform onto a computer system is provided. When executed, the program product comprises: (1) an interface for entering computer system identifiers and for selecting a software platform; (2) program code configured to locate and query a control file to identify an entry in the control file having computer system identifiers that match the entered computer system identifiers; (3) program code configured to display support data from the identified entry; and (4) program code configured to created a boot disk for the selected software platform to be loaded onto a computer system having the entered computer system identifiers.

Therefore, the present invention provides a method and system for loading a software platform onto a computer system.

BRIEF DESCRIPTION OF THE DRAWINGS

These and other features and advantages of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

In general, the present invention provides a method and system for loading a software platform onto a computer system. Specifically, a user will first designate a particular target computer system by entering a computer model identifier and a computer submodel identifier into an interface. Next, the user will select the particular operating system using the interface. A control file corresponding to the selected software platform will then be located. The control file has entries of computer model identifiers, computer submodel identifiers, and support data. The located control will then be queried to identify an entry having computer model identifiers and submodel identifiers that match the entered identifiers. If a match is established, the support data from the identified entry will be displayed. Based upon the support data, a boot disk can be created and the selected software platform can be loaded onto the target computer system.

Figure 1:
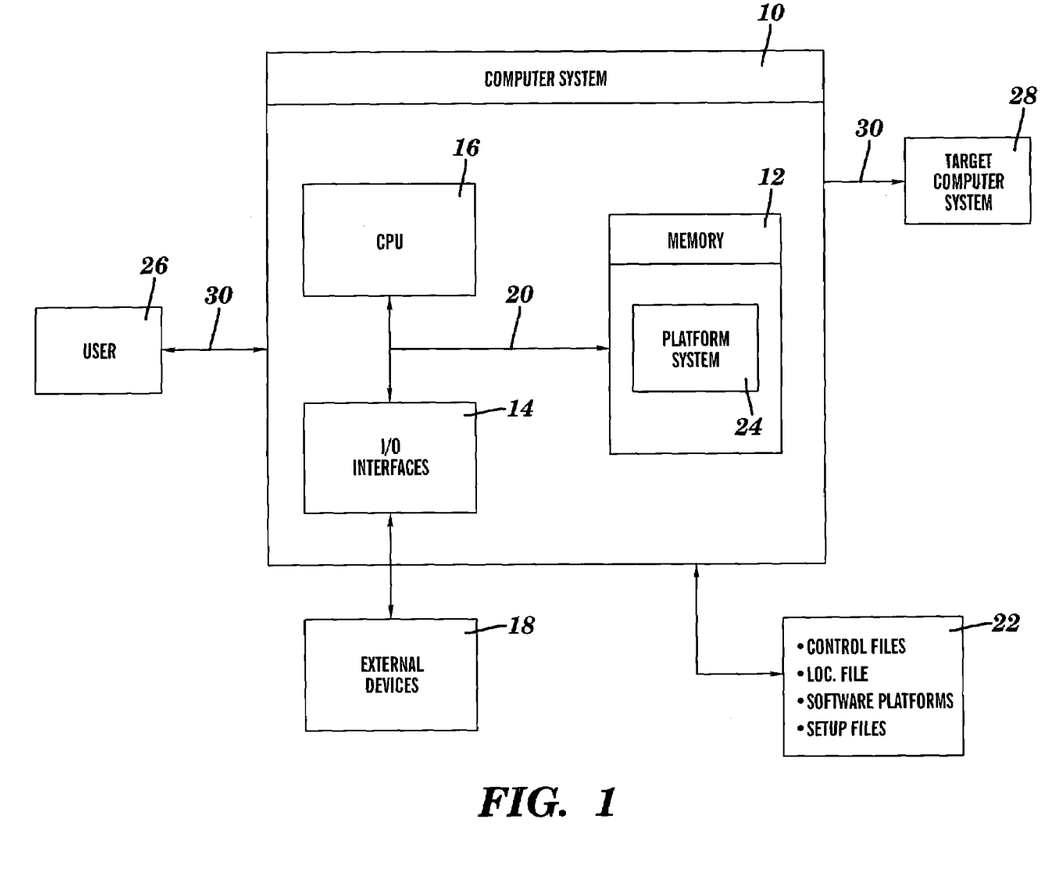
FIG. 1 depicts a computer system having a platform system according to the present invention.

Referring now to FIG. 1, a computer 10 that includes platform system 24 of the present invention is shown. Computer system 10 generally comprises memory 12, input/output interfaces 14, a central processing unit (CPU) 16, external devices/resources 18, bus 20, and resource server 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is platform system 24 (shown in FIG. 1 as a software product). Platform system 24 will be described in more detail below but generally comprises a method and system for loading a software platform on target computer system 28. Specifically, platform system 24 includes an interface (described in further detail below), which allows user 26 to designate a particular target computer system 28 and a particular software platform. Platform system 24 will automatically locate a control file having entries of computer model identifiers, computer submodel identifiers, and support data. Once located, platform system 24 will query the control file to identify an entry having identifiers that correspond to the designated target computer system 28 (i.e., that match the entered identifiers). Based upon the support data from the identified entry, a boot disk can be created and the designated software platform can then be loaded onto the designated target computer system 28.

Resource server 22 provides storage for resources necessary to carry out the present invention. Such resources could include, inter alia: (1) control files; (2) a locator file; (3) software platforms; and (4) setup files. Resource server 22 may include one or more databases/storage devices, such as a magnetic disk drive or an optical disk drive. In another preferred embodiment resource server 22 includes data distributed across, for example, a local area network (LAN), wide area network (WAN) or a storage area network (SAN) (not shown). Resource server 22 may also be configured in such a way that one of ordinary skill in the art may interpret it to include one or more storage devices.

Communication with computer system 10 occurs via communication links 30. Communications links 30 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 2:
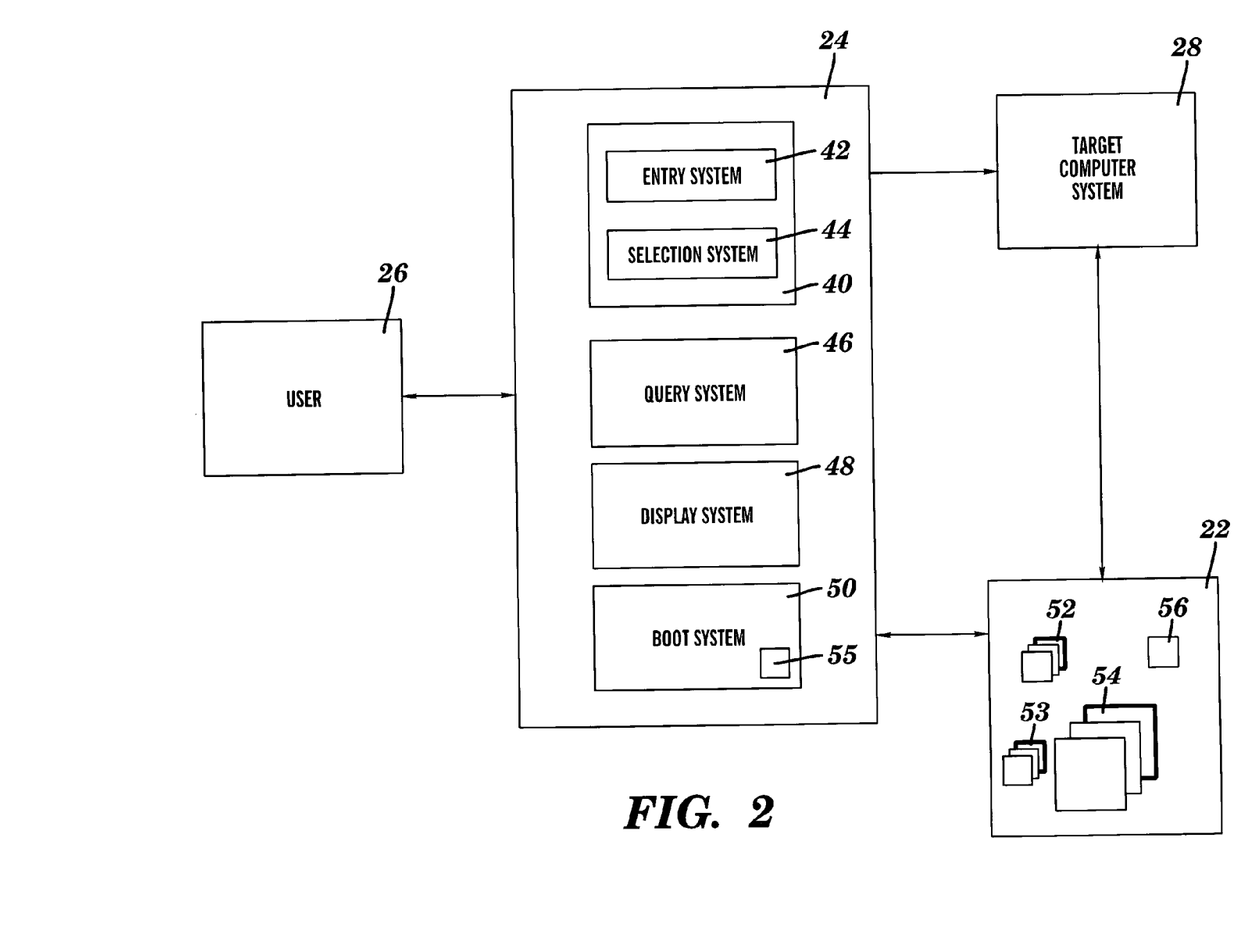
FIG. 2 depicts a box diagram of the platform system of FIG. 1.

Referring now to FIG. 2, platform system 24 is shown in greater detail. As depicted, platform system generally includes interface 40, query system 46, display system 48, and boot system 50. Interface 40 provides a way for user 26 to designate a particular target computer system 28 by entering computer model identifiers and submodel identifiers via entry system 42. Moreover, user 26 can select a desired software platform 54 to be loaded onto target computer system via selection system 44. Once user 26 has entered/selected the necessary details, query system 46 will access resource server 22 to locate and query a control file 52 that pertains to the selected software platform. Specifically, a separate control file 52 preferably exists for each different software platform 54. Each entry in control file 52 preferably pertains to a particular target computer system 28 and includes computer model identifiers and computer submodel identifiers for the particular target computer system 28. In addition, each entry in control file 52 also preferably includes support data to help user 26 determine whether target computer system 28 can support the selected software platform 54.

As indicated above, locating a particular control file 52 could be a time consuming task. This is especially the case where there are numerous software platforms and/or numerous versions of the same control file 52. In the past, user 26 was forced to manually locate a relevant control file 52. However, the file actually located might not have been the most recent. This often left user 26 with inaccurate results. Under the present invention, query system 46 will access locator file 56 to identify the location of the most recent version of the control file 52 corresponding to the selected software platform 54. Locator file 56 preferably has separate entries corresponding to each software platform. Thus, if user 26 is attempting to load the Windows 2000 software platform on target computer system 28, a Windows 2000 entry in locator file 56 will identify the exact location of the most recent Windows 2000 control file 52.

An example of an entry in locator file 56 is as follows:

DESCription=Client for e-business for Windows 2000 v1.1.000.AH
PLATform=Win2000
CUSTtomer=IBM
NAME=w2kv11
NumberFiles=26
MACHine=@ospw2k\11000ah\mtb.ini
BIOS=@ospw2k\11000ah\mtb.ini
ASK=Yes
version=11000ah
LICENSE=license6.txt
PRE=ospw2k\11000ah\w2kpre.bat
INIT_SCRIPT=bootdisk\delete.txt
STAGE_SCRIPT=bootdisk\stagew2k.txt
MID=ospw2k\11000ah\w2kmid.bat
CLONE_SCRIPT=?DRIVE1>3900 bootdisk\clone2k.txt
POST=ospw2k\11000ah\w2kpost.bat
PQDI=/NRB/NBS/NSS
[FinalPartitionMap]
Part1Size=7520
Part2Size=-1
Part2Format=NTFS
Part3Format=NTFS
SysPartLimit=7520

Locator file 56 can provide any information (e.g., server/drive address) that helps identify the location where the most recent version of a pertinent control file 52 is stored.

Once, the location of control file 52 has been identified, query system 46 will automatically query the located control file 52 to determine whether the selected software platform 54 is supported by the designated target computer system 28. Specifically, as indicated above, each control file 52 pertains to a particular software platform 54 and includes entries that each pertain to a particular target computer system 28. For example, control file "A" could pertain to Microsoft Windows 2000 software platform. Each entry in control file "A" would include computer model identifiers and computer submodel identifiers that pertain to a specific target computer system on which Windows 2000 could be loaded. Thus, query system 46 queries control file 52 to identify a particular entry having computer model and submodel identifiers that match the identifiers entered by user 26 (i.e., the entered identifiers are compared to the identifiers in each entry to determine a match). If a match cannot be established, user 26 can be informed of this by an error message or the like, and the selected software platform 54 will not be loaded. Conversely, if a match is established, support data from the identified entry is retrieved and displayed, via display system 48, at interface 40. Support data can include any technical data and/or licensing data helpful in determining whether target computer system 28 supports the selected software platform 54. Specifically, technical data can identify any computer requirements necessary for loading a software platform including, among other things, BIOS information, driver quantity, RAM requirements, etc. Licensing data could indicate whether the designated target computer system 28 came with the selected software platform 54 (e.g., Windows 2000) pre-loaded. This would indicate whether a license is needed for legal loading of the selected software platform 54. Specifically, if designated target computer system 28 came with selected software platform 54 pre-loaded, a new license is not necessary.

An example of an entry in a Windows 2000 control file could be as follows:

[0123-***]
model=BIOS Test Bypass
preload=yes
image=w2kv11
biosdate=19852615
biosdisk=0bypass
setbios=
numdrivers=0
[1171-91*]
model=ThinkPad I-Series 1300
preload=no
image=w2kv11
biosdate=20001222
biosdisk=spsdkw54
setbios=
d1=iseries
o1=1
n1=I-Series Custom
d2=dialer
o2=1
n2=IGN Dialer
d3=mobsetup
o3=1
n3=Mobile IP Address
numdrivers=3

Thus, the entry identifies a particular target computer system according to model identifier (1171) and submodel identifier (91*). As shown in the entry above, the entered model and submodel identifiers pertain to a ThinkPad I-series 1300. The other data in the entry 54 helps user 26 determine whether target computer system 28 can support Windows 2000.

Based upon the support data (i.e., if target computer system 28 can support selected software platform 54), boot system 50 will access setup files 53 in resource server 22 to create boot disk 55 and selected software platform 54 will loaded onto target computer system 28. Boot disk 55 identifies, among other things, a network connection for target computer system 28 to communicate with resource server 22. Once created, boot disk 55 is loaded (e.g., manually or downloaded from platform system 24) onto target computer system 28. Using the information in boot disk 55, target computer system 28 will communicate with resource server 22 and download the selected software platform 54.

Thus, the present invention provides, among other things, a way to automatically locate and query a relevant control file.

Such automatic operation provided under the present invention eliminates the need for user 26 to make manual, time consuming searches. It should be understood that the depiction of platform system 24 is illustrative only and other equivalents could exist. For example, the functions of display system 48 could be incorporated into query system 46.

Figure 3:
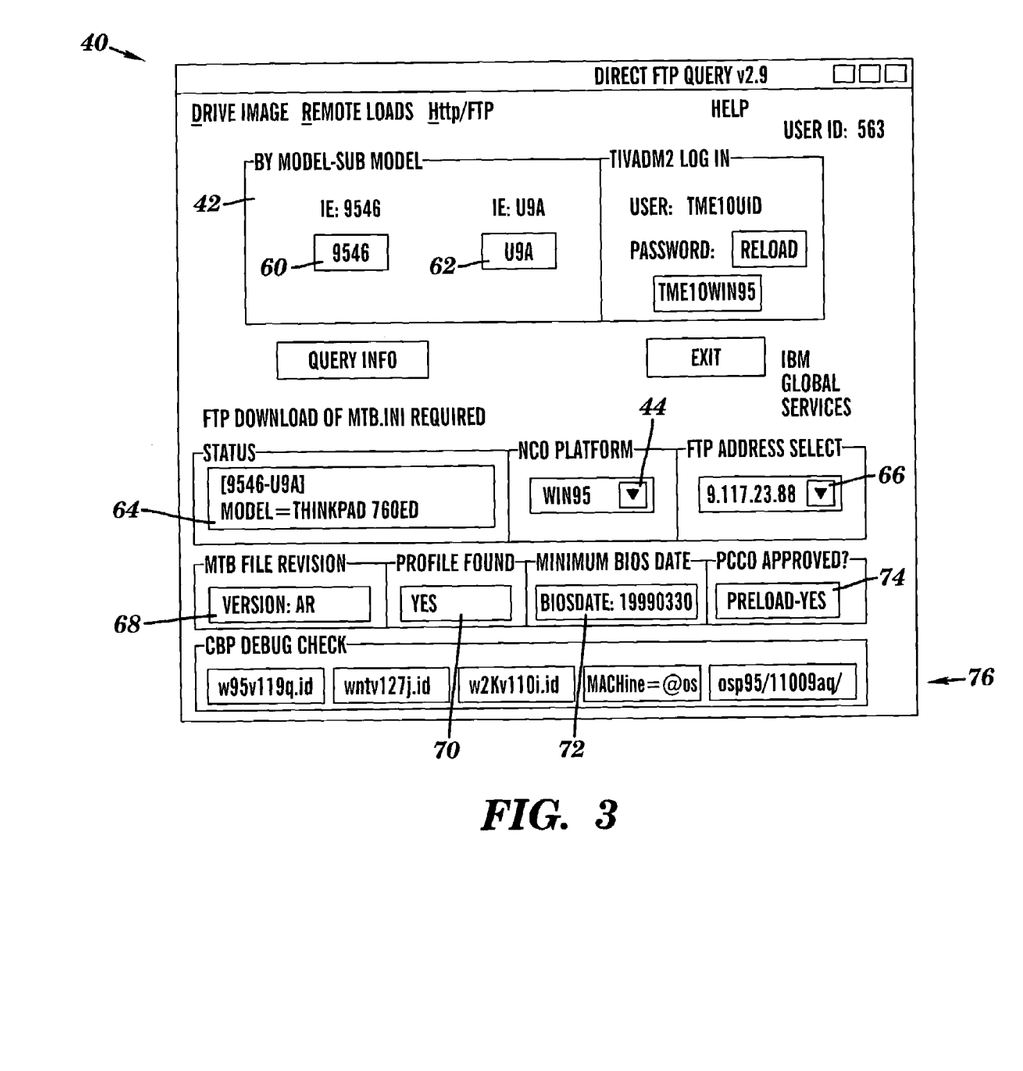
FIG. 3 depicts an exemplary view of an interface according to the present invention.

Referring now to FIG. 3, a more detailed depiction of interface 40 is depicted. As depicted, interface 40 includes entry system 42 for entering computer model identifiers 60 and computer submodel identifiers 62 (i.e., for designating a particular target computer system) and selection system 44 for selecting a particular software platform. As depicted, model identifiers "9546" and submodel identifiers "u9a" have been entered while Windows 95 has been selected for loading. Also shown is status window 64 for indicating a status of a query. As indicated in status window 64, the entered identifiers 60 and 62 pertain to "ThinkPad 750ED." Address indicator 66 indicates a location of the relevant (i.e., Windows 95) control file. As explained above, several versions of a control file could exist. Thus, the location of the most current control file is preferably identified by querying the locator file. Once located, version indicator 68 indicates which version was located and is being queried. Profile indicator 70 could indicated whether a query of the located control file yielded an entry having identifiers that match the entered identifiers. In the example shown in FIG. 3, a match has been identified. BIOS indicator 72 indicates the minimum BIOS date necessary for loading the selected software platform on the target designated computer system. Pre-load indicator 74 indicates licensing data. Specifically, pre-load indicator 74 indicates whether the designated target computer system came with the selected software platform pre-loaded. Other support data 76 helpful or necessary for loading the selected software platform could also be displayed via interface 40. It should be appreciated that interface 40 depicted in FIG. 3 is intended to be illustrative only and other variations could exist.

Figure 4:
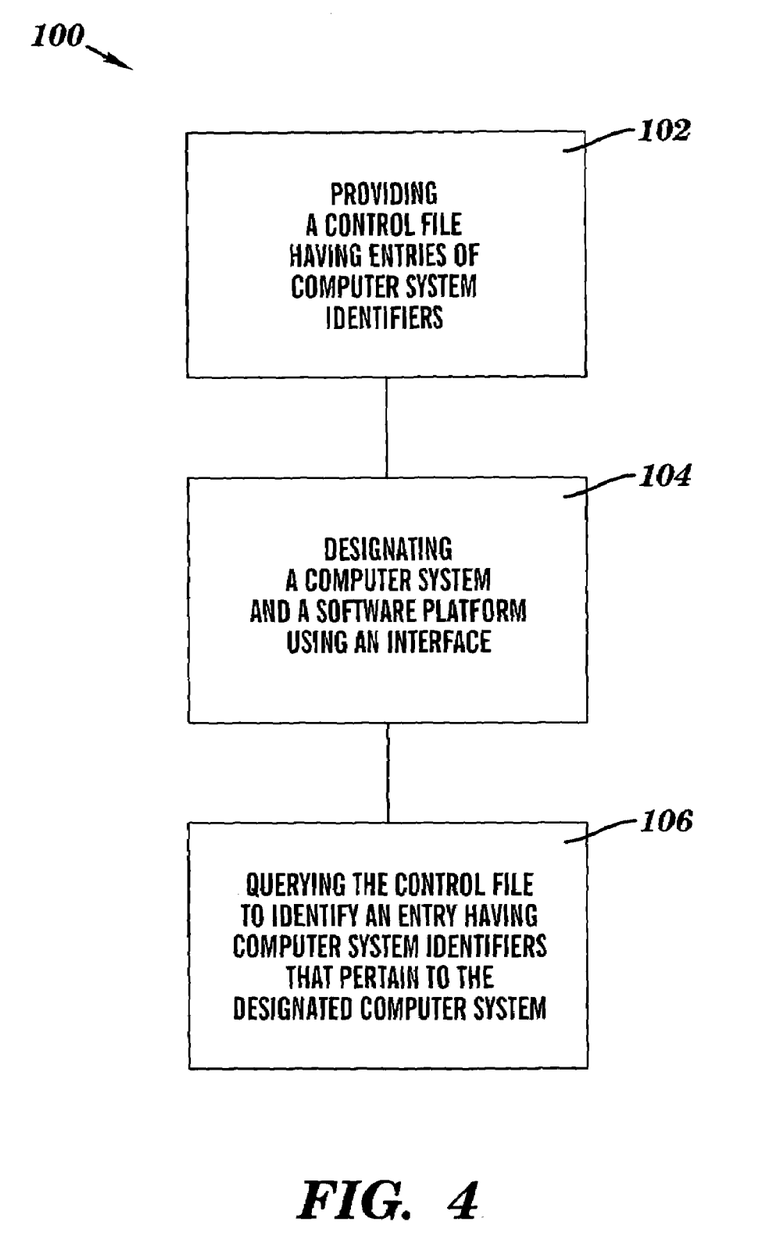
FIG. 4 depicts a method flow chart according to the present invention.

Referring now to FIG. 4, a flowchart of a method 100 according to the present invention is shown. First step 102 of method 100 is to provide a control file having entries of computer system identifiers. Second step 104 is to designate a computer system and a software platform using an interface. Third step 106 of method 100 is to query the control file to identify an entry having computer system identifiers that pertain to the designated computer system.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for installing a software platform onto a computer system, comprising the following steps:

providing a plurality of control files, each control file pertaining to a different particular software platform and having entries of computer system identifiers pertaining to the particular software platform;

designating, by a user, a computer system and a software platform of a plurality of software platforms to be installed on the designated computer system using a graphical user interface; and querying the control file of the particular software platform corresponding to the software platform designated by the user to identify an entry having computer system identifiers that pertain to the designated computer system.

2. The method of claim 1, further comprising the subsequent steps of:
creating a boot disk; and
installing the designated software platform onto the designated computer system using the boot disk.

3. The method of claim 1, wherein the designating step comprises the steps of:
entering particular computer system identifiers into the interface; and
selecting a particular software platform using the interface.

4. The method of claim 3, wherein the entering step comprises the steps of:
entering a particular computer model identifier into the interface; and
entering a particular computer submodel identifier into the interface.

5. The method of claim 1, wherein the entries in the control file further comprise support data.

6. The method of claim 5, wherein the support data comprises licensing data and technical data.

7. The method of claim 5, further comprising the step of displaying the support data from the identified entry.

8. The method of claim 7, wherein the designated software platform is installed onto the computer system based upon the support data.

9. A method for installing a software platform onto a computer system, comprising the following steps:
providing a plurality of control files, each control file pertaining to a different particular software platform and having entries of computer system identifiers pertaining to the particular software platform, wherein each entry comprises computer system identifiers and support data;
entering, by a user, particular computer system identifiers into a graphical user interface;
selecting, by a user, a particular software platform of a plurality of software platforms using the interface;
querying the control file of the particular software platform corresponding to the software platform designated by the user to identify an entry having computer system identifiers that match the entered computer system identifiers; and
installing the selected software platform onto a computer system having the entered computer system identifiers.

10. The method of claim 9, further comprising the step of displaying the support data corresponding to the identified entry.

11. The method of claim 10, wherein the software platform is installed based upon the displayed support data.

12. The method of claim 9, wherein the support data comprises licensing data and technical data.

13. The method of claim 9, wherein the computer system identifiers comprise a computer model identifier and a computer sub model identifier.

14. A method for installing a software platform onto a computer system, comprising the following steps:
entering, by a user, a particular computer model identifier and a particular computer submodel identifier into a graphical user interface;
selecting, by a user, a particular software platform from a plurality of software platforms using the interface;
locating a control file corresponding to the software platform selected by the user in a plurality of control files, each control file pertaining to a different particular software platform and having entries of computer system identifiers pertaining to the particular software platform, wherein each entry comprises computer model identifiers, computer submodel identifiers, and support data;
querying the located control file to identify an entry having a computer model identifier and a computer submodel identifier that match the entered computer model identifier and computer submodel identifier;
displaying the support data from the identified entry; and
installing the selected software platform onto a computer system having the entered identifiers based upon the displayed support data.

15. The method of claim 14, wherein the support data comprises licensing data and technical data.

16. A system for installing a software platform onto a computer system, comprising:
a graphical user interface for entering, by a user, computer system identifiers and for selecting a software platform from a plurality of software platforms;
a query system for querying a control file corresponding to the software platform selected by the user in a plurality of control files, each control file pertaining to a different particular software platform and having entries of computer system identifiers pertaining to the particular software platform, to identify an entry in the control file having computer system identifiers that match the entered computer system identifiers; and
a boot system for creating a boot disk, based upon the identified entry, for die selected software platform to be installed onto a computer system having the entered computer system identifiers.

17. The system of claim 16, wherein the interface comprises:
an entry system for entering computer system identifiers; and
a selection system for selecting a software platform.

18. The system of claim 16, wherein the computer system identifiers comprise a computer model identifier and a computer sub model identifier.

19. The system of claim 16, wherein the control file comprises entries, and wherein each entry includes computer system identifiers and support data.

20. The system of claim 19, further comprising a display system for displaying the support data from the identified entry.

21. The system of claim 19, wherein the selected software platform is installed onto the computer system based upon the displayed support data.

22. The system of claim 16, wherein the selected software platform is an operating system.

23. A system for installing a software platform onto a computer system, comprising:
an entry system for entering, by a user, computer system identifiers;
a selection system for selecting, by a user, a software platform from a plurality of software platforms;
a query system for querying a control file corresponding to die software platform selected by the user in a plurality of control files, each control file pertaining to a different particular software platform and having entries of computer system identifiers pertaining to the particular software platform, to identify an entry having computer system identifiers that match the entered computer system identifiers; and
a boot system for creating a boot disk, based upon the identified entry, for the selected software platform to be installed onto a computer system having the entered computer system identifiers.

24. The system of claim 23, wherein the entry system and the selection system comprise an interface.

25. The system of claim 23, wherein the computer system identifiers comprise a computer model identifier and a computer submodel identifier.

26. The system of claim 23, wherein the control file comprises entries, and wherein each entry includes a computer model identifier, a computer submodel identifier, and support data.

27. The system of claim 26, further comprising a display system for displaying the support data from the identified entry.

28. The system of claim 27, wherein the selected software platform is installed onto the computer system based upon the displayed support data.

29. A system for installing a software platform onto a computer system, comprising:
   a graphical user interface having:
      an entry system for entering, by a user, a computer model identifier and a computer submodel identifier; and
      a selection system for selecting, by a user, a software platform from a plurality of software platforms;
   a query system for querying a control file corresponding to the software platform selected by the user in a plurality of control files, each control file pertaining to a different particular software platform and having entries of computer system identifiers pertaining to the particular software platform, to identify an entry in the control file having a computer model identifier and a computer submodel identifier that match the entered computer model identifier and computer submodel identifier;
   a display system for displaying support data from the identified entry; and
   a boot system for creating a boot disk, based upon the identified entry, for the selected software platform to be installed onto a computer system having the entered computer model identifier and computer submodel identifier.

30. A program product stored on a recordable medium for installing a software platform onto a computer system, which when executed, comprises:
   a graphical user interface for entering, by a user, computer system identifiers and for selecting a software platform from a plurality of software platforms;
   a query system for querying a control file corresponding to the software platform selected by the user in a plurality of control files, each control file pertaining to a different particular software platform and having entries of computer system identifiers pertaining to the particular software platform, to identify an entry in the control file having computer system identifiers that match the entered computer system identifiers; and
   a boot system for creating a boot disk, based upon the identified entry, for the selected software platform to be installed onto a computer system having the entered computer system identifiers.

31. The program product of claim 30, wherein the interface comprises:
   an entry system for entering computer system identifiers; and
   a selection system for selecting a software platform identifier.

32. The program product of claim 30, wherein the computer system identifiers comprise a computer model identifier and a computer sub model identifier.

33. The program product of claim 30, wherein the control file comprises entries, and wherein each entry includes computer system identifiers and support data.

34. The program product of claim 33, further comprising a display system for displaying the support data from the identified entry, wherein the software platform is installed based upon the displayed support data.

35. A program product stored on a recordable medium for installing a software platform onto a computer system, which when executed, comprises:
   graphical user interface for entering, by a user, computer system identifiers and for selecting a software platform from a plurality of software platforms;
   program code configured to query a control file corresponding to the software platform selected by the user in a plurality of control files, each control file pertaining to a different particular software platform and having entries of computer system identifiers pertaining to the particular software platform, to identify an entry in the control file having computer system identifiers that match the entered computer system identifiers;
   program code configured to display support data from the identified entry; and
   program code configured to create a boot disk, based upon the identified entry, for the selected software platform to be installed onto a computer system having the entered computer system identifiers.

* * * * *